United States Patent [19]
West

[11] Patent Number: 4,690,389
[45] Date of Patent: Sep. 1, 1987

[54] HYDRAULICALLY DAMPED MOUNTING DEVICE

[75] Inventor: John P. West, Devizes, England

[73] Assignee: Avon Industrial Polymers Limited, Wiltshire, England

[21] Appl. No.: 763,123

[22] Filed: Aug. 6, 1985

[30] Foreign Application Priority Data

| Aug. 7, 1984 [GB] | United Kingdom | 8420035 |
| Jan. 25, 1985 [GB] | United Kingdom | 8501863 |
| May 28, 1985 [GB] | United Kingdom | 8513408 |

[51] Int. Cl.⁴ .................. F16M 5/00; F16F 15/04; F16F 7/10; B60G 15/04
[52] U.S. Cl. .................. 267/140.1; 188/379; 248/562; 267/195; 267/292
[58] Field of Search .... 267/140.1, 140.4, 141.2-141.7, 267/8 R, 35, 57.1 R, 63 R, 63 A, 122, 152, 123, 153, 64.19, 64.23, 64.27; 188/298, 378, 379; 180/300, 73.4; 248/562, 636, 638, 659, 609; 29/149.5 NM, 451

[56] References Cited

U.S. PATENT DOCUMENTS

| 3,101,937 | 8/1963 | Stearns | 267/122 |
| 3,642,268 | 2/1972 | Hipsher | 267/140.1 X |
| 3,698,703 | 10/1972 | Hipsher | 248/562 X |
| 4,277,056 | 7/1981 | Ticks | 267/140.1 |
| 4,377,216 | 3/1983 | Ueno | 248/562 X |
| 4,458,888 | 7/1984 | Wolf et al. | 267/140.1 |

FOREIGN PATENT DOCUMENTS

| 9120 | 4/1980 | European Pat. Off. . | |
| 14742 | 9/1980 | European Pat. Off. . | |
| 57774 | 8/1982 | European Pat. Off. . | |
| 71698 | 2/1983 | European Pat. Off. . | |
| 0115417 | 8/1984 | European Pat. Off. | 262/140.1 |
| 2394715 | 1/1979 | France . | |
| 2495718 | 6/1982 | France . | |
| 63141 | 5/1981 | Japan | 267/140.2 |
| 94043 | 7/1981 | Japan | 267/140.1 |
| 81249 | 5/1983 | Japan | 267/141.2 |
| 37349 | 2/1984 | Japan | 188/378 |

OTHER PUBLICATIONS

Patent Astracts of Japan, vol. 6, No. 187, 25 Sep. 1982, and Japanese 57 94 146, 11 Jun. 1982.
Patent Abstracts of Japan, vol. 6, No. 1, 7 Jan. 1982 and Japanese 56 124 739, 3 Sep. 1981.

*Primary Examiner*—Andres Kashnikow
*Assistant Examiner*—Robert J. Oberleitner
*Attorney, Agent, or Firm*—Merchant, Gould, Smith, Edell, Welter & Schmidt

[57] ABSTRACT

A hydraulically damped mounting device has two anchor parts, in the form of a sleeve and a tube, connected together by a resilient wall. The resilient wall and the sleeve define a working chamber for hydraulic liquid which is connected to a compensation chamber by a passageway. The passageway may extend directly through the tube or peripherally of the sleeve. The compensation chamber is bounded by a bellows wall, permitting the volume of the compensation chamber to change freely as vibrations of the tube relative to the sleeve change the volume of the working chamber, without the bellows wall being subject to tensile stresses. The sleeve may be formed in two parts which are forced together during manurfacture, enabling a compact construction to be achieved.

9 Claims, 15 Drawing Figures

HYDRAULICALLY DAMPED MOUNTING DEVICE

BACKGROUND OF THE INVENTION

1. Field of the Invention

The present invention relates to a hydraulically damped mounting device.

2. Description of the Prior Art

In our published European Patent Application No. 0115417A we discussed hydraulically damped mounting devices in which two parts of a piece of machinery e.g. a car engine and chassis were connected together by a resilient wall which, together with a partition, defined a working chamber for hydraulic fluid. The working chamber was connected to a compensation chamber by a passageway (usually elongate), the compensation chamber being separated from the working chamber by a rigid partition. A flexible diaphragm was in direct contact with the liquid in the working chamber and separated that liquid from a gas pocket. The purpose of that mounting device was to provide a frequency-responsive device, which could isolate high and low frequency vibrations independent of their amplitude (within certain amplitude ranges).

In the hydraulically damped mounting device of EP-A-0115417 the two parts of the machinery were respectively connected to a cup and a boss with the deformable, preferably resilient, wall holding the boss within the mouth of the cup. However, hydraulically damped mounting devices do not all have this configuration, and a hydraulically damped mounting device is known from e.g. U.S. Pat. No. 3,642,268 in which the anchor part for one part of the vibrating machinery is in the form of a hollow sleeve with the other anchor part in the form of a rod or tube extending approximately centrally and coaxially of the sleeve. Resilient walls then join the sleeve and the tube and, in that patent specification, define two chambers connected by a passageway. The chambers are filled with hydraulic fluid and the movement of the fluid from one chamber to the other through the passageway damps the vibration of the parts of the machinery attached to the respective anchor points.

Mounting devices of this type, in which there is a first anchor part e.g. in the form of a tube, within a second anchor part in the form of a sleeve, with the sleeve and tube being connected by resilient walls, are desirable because they permit a compact construction, all parts being enclosed within the sleeve, but problems have been encountered. The main problem is that rubber, the material commonly used to form the resilient walls, should not be put under a tensile load, and any vibration which compresses the walls bounding one chamber also requires an expansion in the walls bounding the other chamber, i.e. tensile stresses are generated. In U.S. Pat. No. 3,642,268 an attempt is made to solve this problem, by forcing the resilient walls into the sleeve and/or expanding the tube to pre-compress the resilient walls. If all the walls are pre-compressed during the manufacture of the mounting device, then limited vibration is possible without exceeding the compression in the walls, which would generate tensile forces. However in practice, the strains placed on the walls due to vibration are 25% to 50% and it is difficult to pre-compress the walls sufficiently to permit this, as the rubber becomes unstable. Therefore, it has not proved possible to manufacture a commercially practicable device of this design.

Published European patent application No. 0009120 also discloses a hydraulically damped mounting device having an anchor part in the form of a tube within a sleeve. In this specification the sleeve is in two parts, one coaxially within the other and the passageways between chambers formed by resilient walls between the tube and sleeve are between the two sleeve parts. However, this device also suffers from the problem of tensile stresses, because any vibration must induce tensile loads in at least one of the resilient walls.

SUMMARY OF THE INVENTION

Therefore the present invention proposes, in a first aspect, that one chamber should be bounded by a bellows wall, a convoluted wall for which the shape of the convolutions can alter relatively freely to increase or decrease the volume of the chamber which it bounds i.e. it can act as a compensation chamber. The other chamber is bounded by a resilient wall, which is compressed when a load is applied to the mounting device. Vibrations may reduce or increase the compression in the resilient wall but no tensile stresses are generated in the bellows wall, both when a load is applied and under vibration, due to its shape. Thus, unlike the mounting device of U.S. Pat. No. 3,642,268, the mounting device of the present invention is asymmetric in that it must be positioned so that the working chamber, not the compensation chamber, is compressed under load.

The bellows wall may be completely separate from the resilient wall. However, from the point of view of ease of construction, it is preferable for the resilient wall and the bellows to be formed integrally, joined adjacent the sleeve walls and/or adjacent the central anchor part (normally in the form of a tube as mentioned above). The chamber defined by the bellows acts as a compensation chamber and the expansion and contraction of this chamber due to fluid movement in the passageway is relatively unrestricted, since there is virtually no resilient resistance to volume change. As a result the bellows wall does not significantly affect the total stiffness of the mounting device, and so gives advantageous results.

One construction of a mounting device according to the present invention involves the use of an inner sleeve and an outer sleeve. The deformable wall and the bellows wall are moulded onto the central tube and the inner sleeve, and then the inner sleeve is inserted within a bore in the outer sleeve. The passageway connecting the working chamber (bounded by the deformable wall) and the compensation chamber (bounded by the bellows) may then be defined between the inner sleeve and the walls of a slot in the outer sleeve. Alternatively, the passageway may be defined by a tube passing within the inner sleeve. The walls of this tube may be rigid, in which case they are preferably formed by a metal tube attached by e.g. welding to the interior of the inner sleeve, or by resilient material, e.g. an extension of the deformable wall. It will also be possible for the passageway to pass entirely outside the outer sleeve.

However, the presently preferred arrangement is for the passageway to extend through the central tube, i.e. directly from the working chamber to the compensation chamber. This enables a compact construction to be achieved, and is easier to make than a passageway around the sleeve. If the length of a short straight passageway between the chambers is not sufficient to achieve the desired damping characteristics, a convoluted part may be provided forming an extension of the passageway.

The mounting device preferably has a flexible diaphragm, one side of which is in contact with the liquid in the working chamber. However, unlike the diaphragm of the mounting device of EP-A-0115417, the diaphragm of the mounting device of the present invention need not separate the liquid from a gas pocket. It would be possible to do this, and so achieve the gas-spring effect discussed in that European Patent Application, but it would also be possible for the other side of the diaphragm to open directly to the outside of the mounting device. In either case, the flexible diaphragm absorbs high frequency low amplitude vibrations, by permitting rapid changes in the volume of the working chamber with little damping effect. As with the diaphragms of the mounting devices in EP-A-0115417, however, at higher amplitudes, generally corresponding to lower frequencies, it is desirable that the vibrations are damped and so the vibration of the diaphragm must be limited. The limiting of the vibration means that further changes in the position of the deformable wall must be transformed to movement of the liquid through the passageway. The limiting of the amplitude of vibration of the diaphragm also prevents it being damaged by high amplitude vibrations.

The response of the mounting device at lower frequencies is determined, at least in part, by the length and shape of the passageway connecting the working chamber to the compensation chamber, and also by the design of the deformable wall joining the vibrating parts. The deformable wall preferably has a first part of high stiffness and a second part which is more flexible and which deforms such that deformation causes a significant change in the volume of the working chamber. This configuration of the deformable wall is a second, independent aspect of the present invention. This change is transmitted via the passageway to the compensation chamber. The damping effect due to this movement is most significant over a range of frequencies between about 5 Hz and about 30 Hz. At higher frequencies, the vibration of the diaphragm is predominant, and there is very little damping effect.

There are several methods by which a hydraulically damped mounting device according to the present invention may be constructed. The presently preferred construction involves the use of two sleeve parts e.g. halves which are forced together. The deformable wall extends between the central anchor part and one sleeve half, and the bellows wall between the central anchor part and the other sleeve half. When the two sleeve halves are forced together, the bellows wall is compressed (the forces involved are too small to cause significant compression of the resilient wall). This has the advantage that the bellows wall is easier to form, as more space is available prior to the forcing together of the sleeve halves. The compression of the bellows wall also means that it can act as a stop to resist excessive upward movement of the central anchor point, which could result in tensile forces in the resilient wall.

This method is a second, independent, aspect of the present invention. It is applicable both to mounting devices as discussed above, and to mounting devices in which both walls are resilient, but clearly in the latter case the forces necessary to force together the sleeve halves will be greater. The sleeve thus formed by the forcing together of two halves may correspond to the inner sleeve mentioned above; it being fitted within an outer sleeve carrying a mounting bracket. The two halves of the sleeve may be completely separate, or may be joined together by a connection which is deformed when the two sleeve halves are forced together.

BRIEF DESCRIPTION OF THE DRAWINGS

Embodiments of the present invention will now be described, by way of example, with reference to the accompanying drawings, in which.

DETAILED DESCRIPTION

Figure 1:
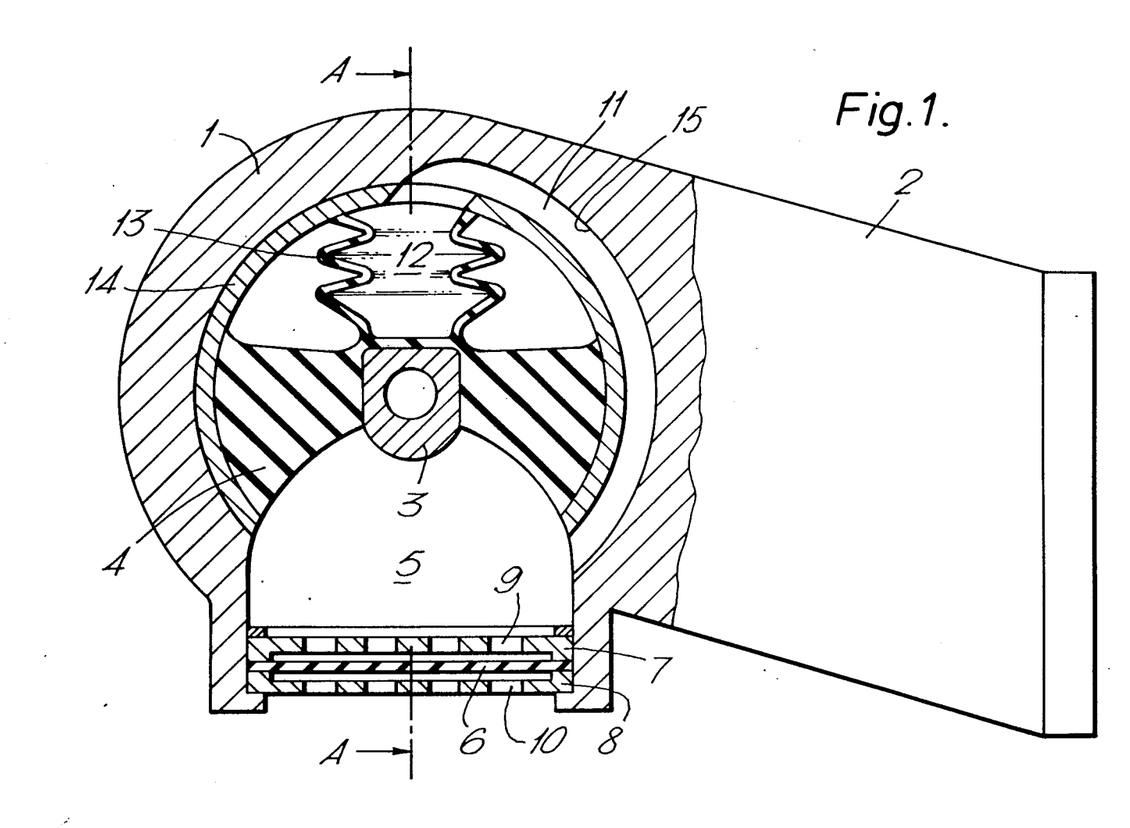
FIG. 1 is a sectional view of a first embodiment of a hydraulically damped mounting device according to the present invention.

Referring first to FIG. 1, a first embodiment of a hydraulically damped mounting device according to the present invention has an outer sleeve 1 of approximately cylindrical shape forming a first anchor point. The outer sleeve 1 conveniently has a fixing bracket 2 by which it can be connected to one part of the vibrating machinery. The second anchor point is formed by a tube 3 which extends approximately axially of the sleeve. Another part of the vibrating machinery is then connected to the tube 3, so that the mounting device damps the vibration between that part and the part attached to the bracket 2. The tube 3 has a bore therethrough to receive a mounting bolt for the corresponding part of the machinery.

A resilient deformable wall 4 connects the tube to the interior of an inner sleeve 14 secured within the outer sleeve 1. One side of this wall 4 bounds a working chamber 5 which is filled with hydraulic liquid. Also bounding the working chamber 5 is a flexible diaphragm 6 mounted in a wall of the sleeve, and held between two mounting plates 7 and 8, the upper mounting plate 7 having holes 9 so that the liquid in the working chamber 5 contacts one side of the diaphragm 6. The other side of the diaphragm 6 is in contact with the atmosphere through holes 10 in the lower mounting plate 8.

A passageway 11 extends through the inner sleeve 14 and a slot 15 in the outer sleeve 1 extends the passageway 11 from the working chamber 5 to a compensation chamber 12. The compensation chamber is bounded by a flexible wall 13 forming a bellows. The use of a bellows wall 13, rather than a resilient wall, is important because it permits expansion of the compensation chamber 12 without putting the rubber of the wall 13 under a tensile load.

Figure 2:
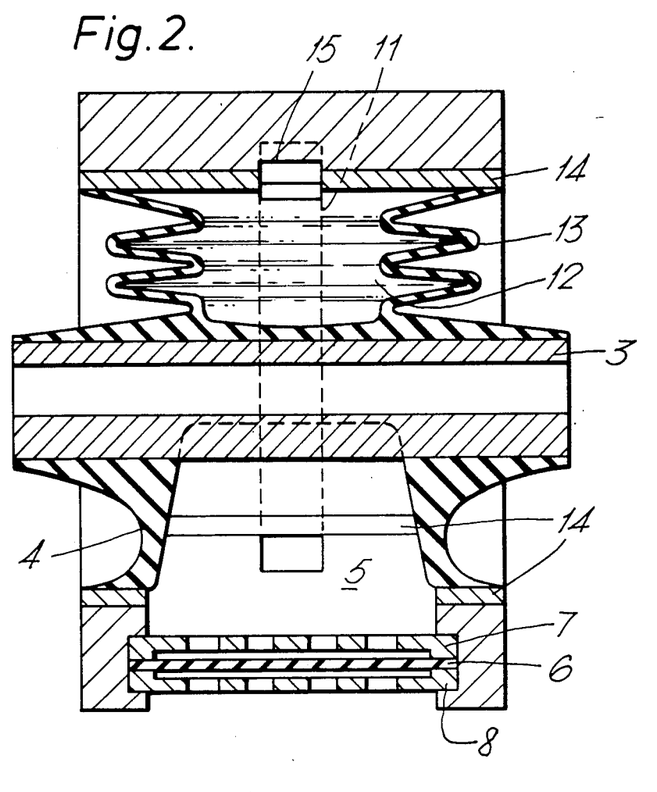
FIG. 2 is a sectional view along the line A—A in Fig. 1.

Comparison of the views of FIGS. 1 and 2 show that the resilient flexible wall 4 has different shapes perpendicular and parallel to the tube 3. The view of FIG. 1 shows that, in the direction perpendicular to the tube 3, the resilient flexible wall 4 is relatively thick and so will have a high resistance to deformation. However, as shown in FIG. 2, the resilient deformable wall 4 is relatively thin in the direction parallel to the tube and therefore will deform more easily. As can be seen from FIG. 2, the part of the resilient flexible wall 4 extending parallel to the tube 3 is curved inwardly into the working chamber 5 and is thinner at a point midway between the tube 3 and the sleeve 1 than at the points where it contacts the tube 3 and the sleeve 1. The reason for this will be explained later.

At very high frequencies the material of the resilient flexible wall 4 stretches and compresses slightly, changing the volume of the working chamber 5. This change in volume is absorbed by the diaphragm 6 with little or no damping effect, so that at very high frequencies the tube 3, and the part of the machine attached to it, vibrate freely of the sleeves 1 and 14. The vibration of the diaphragm 6 is limited by the upper and lower mounting plates 7 and 8 respectively so that at higher amplitudes the diaphragm 'snubs-out' and the liquid is forced through the passageway 11 causing a damping effect due to the mass of liquid and the resistance of the liquid to movement. The snubbing-out of the diaphragm also prevents it being damaged by excessive deformation.

Figure 3:
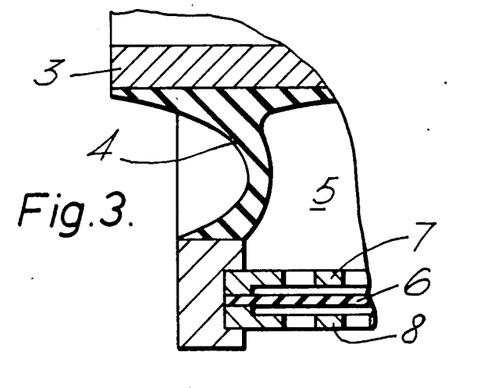
FIG. 3 shows a detail of a part of the mounting device of FIGS. 1 and 2.

At lower frequencies, e.g. less than about 30 Hz, the resilient flexible wall 4 deforms. The shape of the part of the resilient deformable wall 4 parallel to the tube 3 is such that a small change in the distance between the tube 3 and the inner sleeve 14 causes a large change in the volume of the working chamber 5. This is achieved by bending of this part of the resilient deformable wall 4, as its thinner central part bends inwardly (on a downward vibration) into the working chamber 5, as shown in FIG. 3. The change in the volume of the working chamber causes liquid to move out of the working chamber to the compensation chamber 12 through the passageway 11. On an upward vibration the liquid movement is in the opposite direction. The viscosity of the liquid and the constriction effect of the passageway 11, cause a strong damping force to be exerted on the vibration between the tube 3 and the sleeves 1 and 14. This damping effect does not occur at high frequencies because at such frequencies there is little or no movement of the liquid through the passageway, due to the resistance of the fluid to extremely rapid movement.

As the amplitude increases, the deformation of the thinner part of the deformable wall 4 becomes less significant and the thicker part of the deformable wall 4 exerts a high resistance to deformation. This part of the wall 4 causes a strong spring-like force between the tube 3 and the sleeve 1 so that the effective stiffness of the 'spring' joining the tube 3 and the sleeves 1 and 14 increases as the amplitude of vibration increases.

Of course, since the movement of the diaphragm 6, the movement of the liquid through the passageway 11, and the deformation of the thicker part of the resilient deformable wall 4 are all parallel effects, they will each affect every vibration. However, depending on the frequency of vibration, one effect will predominate, so that by adjustment of e.g. the stiffness of the diaphragm 6, the length and diameter of the passageway 11, the shape of the thinner part of the deformable wall 4 and the stiffness of the thicker part of the resilient deformable wall 4, the characteristics of the device at any particular amplitude and frequency may be adjusted.

A number of modifications may be made to the embodiment discussed above, without losing the advantages of the present invention. For example, the diaphragm 6 need not be in direct contact with atmosphere, but could be in contact with a gas pocket corresponding to that discussed in EP-A-0115417. The gas pocket would then provide an air-spring effect at high frequencies.

Figure 4:
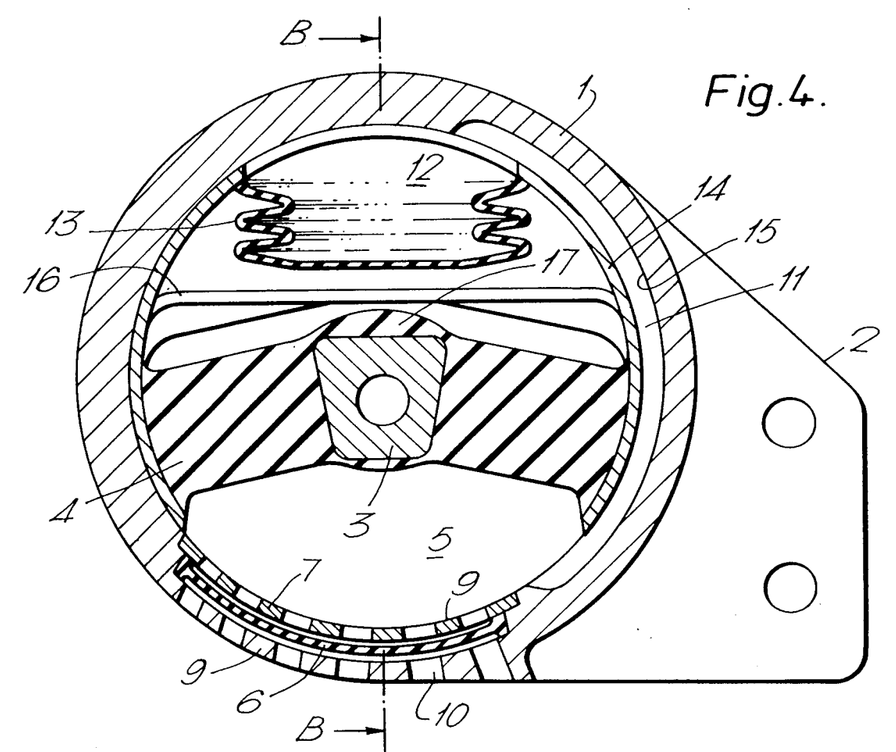
FIG. 4 shows a second embodiment of a hydraulically damped mounting device according to the present invention.
Figure 5:
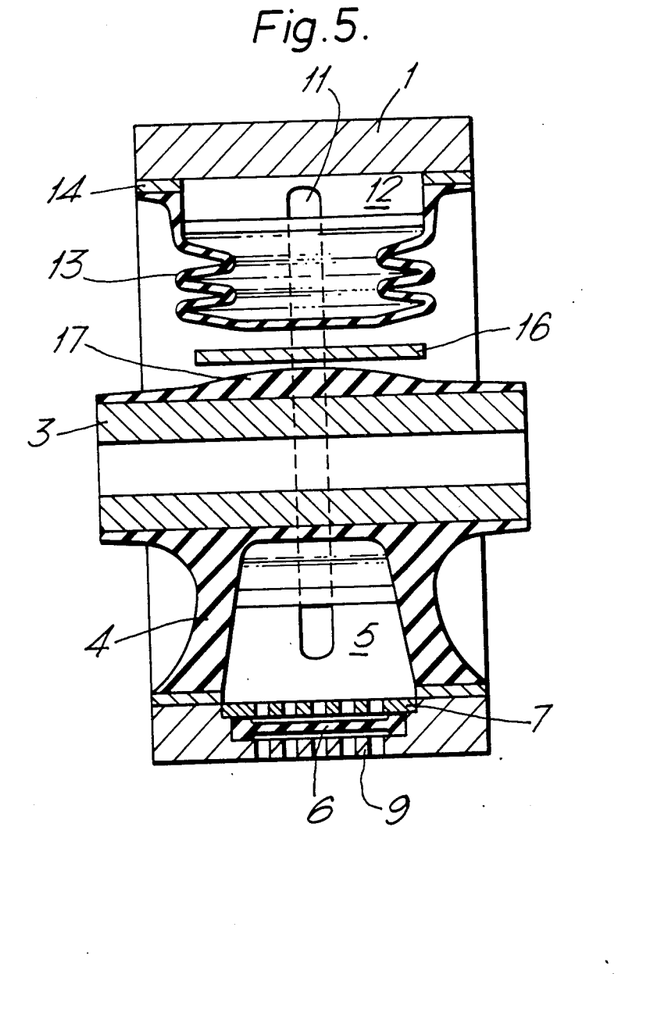
FIG. 5 is a cross-sectional view along the line B—B in FIG. 4.

As shown in FIGS. 1 and 2, the resilient deformable wall 4 and the flexible bellows 13 are moulded from a single piece of material, e.g. rubber, joined together near the tube 3. This arrangement means that the compensation chamber 12 is influenced by changes in the working chamber 5 both due to movement of fluid in the passageway 11 and also by the movement of the tube 3 upwardly or downwardly in FIG. 1. It is not necessary, however, for the deformable wall and the flexible bellows to be attached in this way. FIGS. 4 and 5 illustrate a second embodiment of the present invention in which there is no connection between the bellows wall 13 and the deformable wall 4 adjacent the tube 3. Therefore, the bellows wall 13 and the deformable wall 4 are capable of independent movement, with the only influence being due to the liquid movement through the passageway 11. This arrangement has the advantage that high frequency low amplitude vibrations of the tube 3 may be absorbed entirely by the diaphragm 6 without any influence on the compensation chamber 12. In the arrangement of FIG. 1 any movement of the tube 3 affects the compensation chamber 12. Furthermore, upward movement of the tube 3 is the arrangement of FIG. 1 causes contraction of the compensation chamber 12 and consequent expansion of fluid as the bellows wall 13 is moved by the tube 3. In the arrangement of FIG. 4, however, fluid must be sucked from the compensation chamber 12 during upward movement and vacuum effects reduce the overall damping level. To prevent excessive movement of the tube 3 towards the compensation chamber 12 a rigid wall 16 is provided across the interior of the device between the tube 3 and the bellows 13. A stop 17 of the same material as the deformable wall 4, and lying above the tube 3, abuts against this wall 16 when the movement of the tube 3 has reached its desired maximum. As shown in FIG. 5, the wall 16 need not extend the full length of the tube 3, but may be restricted to the part adjacent the stop. This arrangement also has the advantage that it permits greater freedom in the design of the bellows 13, and so makes possible a reduction in the size of the mounting device relative to that of FIG. 1. The embodiment of FIG. 4 is otherwise similar to that of FIG. 1. Corresponding parts are indicated by the same reference numerals and will not be described in detail here.

Figure 6:
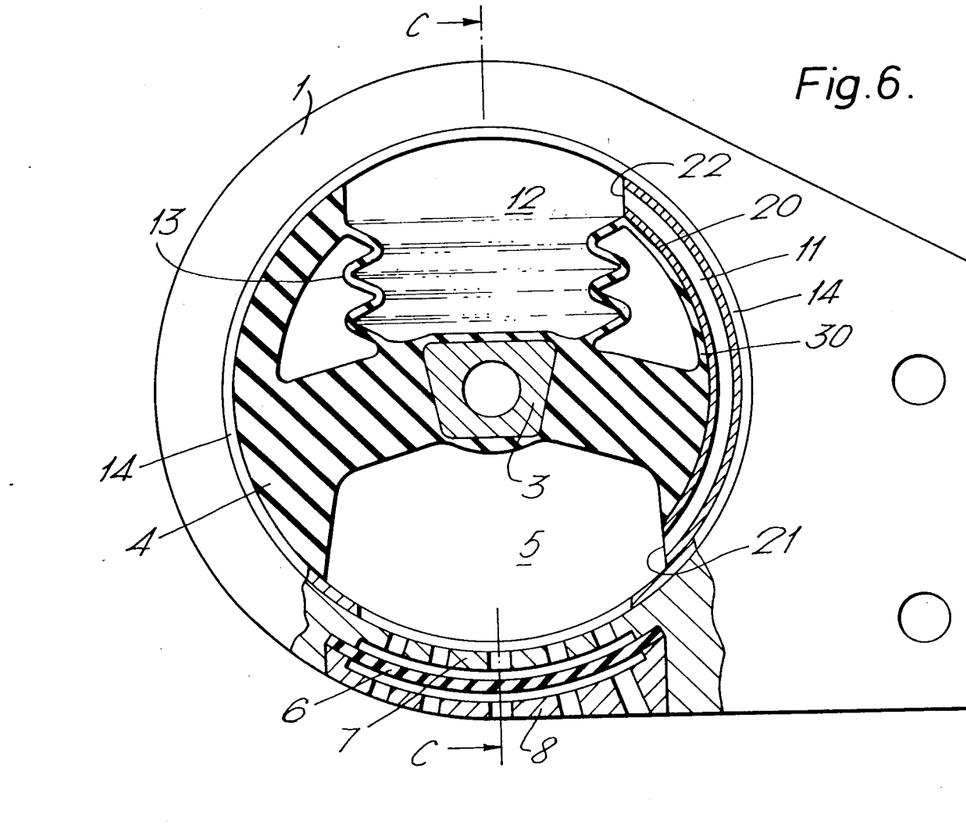
FIG. 6 shows a third embodiment of a hydraulically damped mounting device according to the present invention.
Figure 7:
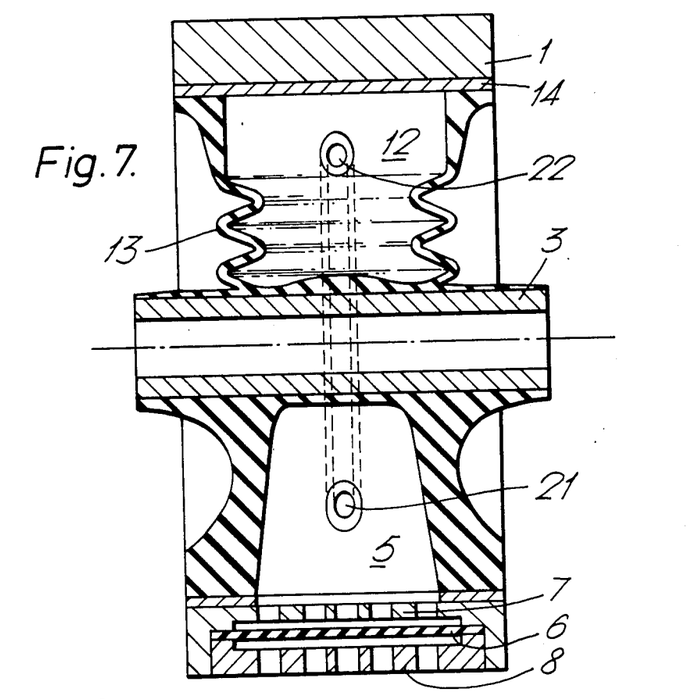
FIG. 7 is a cross-sectional view along the line C—C in FIG. 6.

Both the first and second embodiments of the present invention, discussed above, have the passageway 11 formed between the outer sleeve and the inner sleeve 14 by a slot 15 in the outer sleeve. This is not necessary, and the passageway 11 may be defined by a tube 20 within the inner sleeve 14. An embodiment of this type is shown in FIGS. 6 and 7, in which the tube 20 is mounted on an inner wall of the inner sleeve 14 between the working chamber 5 and the compensation chamber 12. The tube 20 is preferably formed by fixing a closed tube of the desired length and cross-sectional area to the inside of the inner sleeve 14, before the flexible wall 4 and bellows wall 13 are moulded in place, with a layer 30 of material covering the tube 20. For example, the tube 20 may be a closed steel tube welded to the inside of the sleeve 14. Once the moulding of the deformable wall 4 and the bellows wall 13 has been achieved, the ends of the tube 20 are cut off so that orifices 21, 22 of the tube 20 open into the working chamber 5 and the compensation chamber 12 respectively. This technique of manufacture permits the resilient wall 4 and the bellows wall 13 to be formed easily without blocking the tube 20. Again the other parts correspond to parts of the embodiment of FIG. 1 and will not be described in detail.

As shown in FIG. 6, the resilient wall 4 and the bellows wall 14 are moulded integrally, and joined both adjacent the tube 3 and the inner sleeve 14. This is not necessary, however, and the deformable wall 4 and the bellows wall 13 could be as shown in FIG. 4.

The embodiment of FIG. 6 has the advantage that the part of the device within and including the inner sleeve 14 may be formed as an integral unit, which is then fitted into a bore in the outer sleeve 1. Material from the moulding of the deformable wall 4 and the bellows wall 13 on the outside of the inner sleeve 14 then acts as a seal between the inner and outer sleeves.

Figure 8:
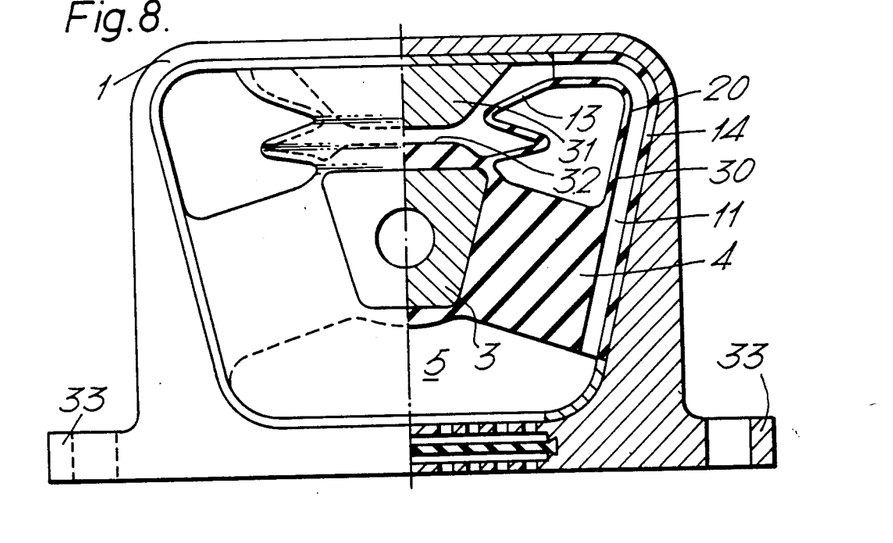
FIG. 8 shows a fourth embodiment of a hydraulically damped mounting device according to the present invention.

It is not necessary that the outer sleeve 1 be circular. As shown in FIG. 8 the outer sleeve 1 has a generally rectangular outer shape, with flanges 33 on either side, by which it is secured to a suitable surface. The passageway is again formed by a rigid tube 20 covered by a layer 30 of material extending from the resilient wall 4 to the bellows wall 13 and integral with those two walls. As shown in FIG. 8, suitable stops 31, 32 may be provided within the compensation chamber 12 to limit upward movement of the tube 3.

Figure 9:
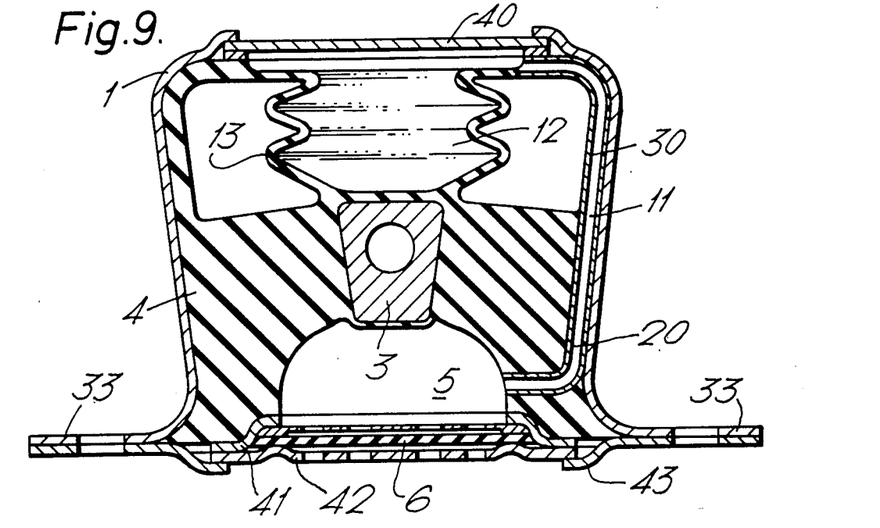
FIG. 9 shows a fifth embodiment of a hydraulically damper mounting device according to the present invention.

In the embodiment of FIG. 8, the resilient wall 4, bellows wall 13 and the material 30 covering the tube 20 are moulded to an inner sleeve 14. However, they may be moulded directly to the outer wall as shown in FIG. 9. Here, the outer wall has a cup-like shape, with the flanges 33 at the top of the cup and the bottom of the cup being sealed by a plate 40 after the resilient wall 4, the bellows 13, and the material 30 have been moulded in place. In this arrangement the diaphragm 6 is mounted between two plates 41, 42 which are held against a plate 43 by pressure of the material of the resilient wall 4, the plate 43 being secured to the flanges 33 on the outer sleeve 1.

Figure 10:
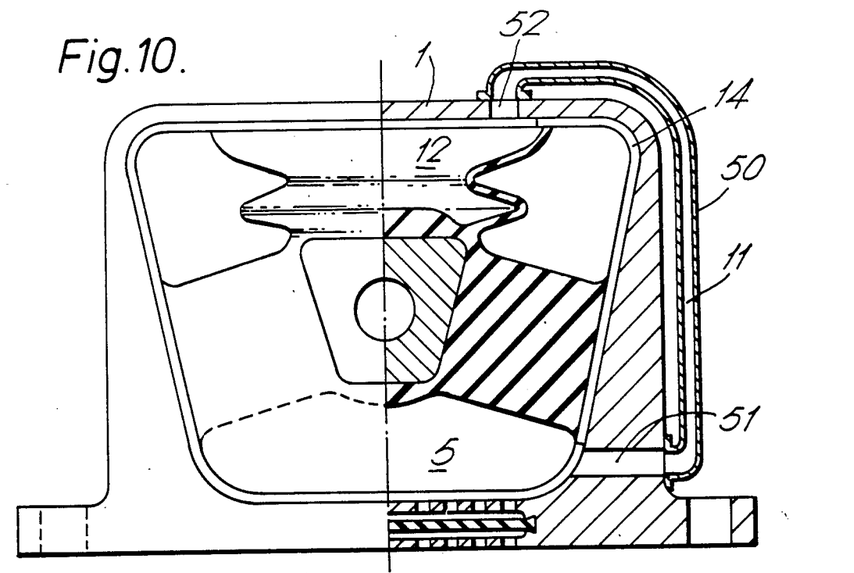
FIG. 10 shows a sixth embodiment of a hydraulically damped mounting device according to the present invention.

In all the embodiments discussed above, the passageway 11 is within the outer sleeve. This is not necessary, however, and the passageway may be formed by a tube 50 extending outside the outer sleeve 1 as shown in FIG. 10. The outer sleeve 1, and the inner sleeve 14 where appropriate, have bores 51, 52 formed in them, the bore 51 communicating with the working chamber 5 and the bore 52 communicating with the compensation chamber 12. These two bores 51, 52 are then joined by the tube 50, thereby to form the passageway 11.

Figure 11:
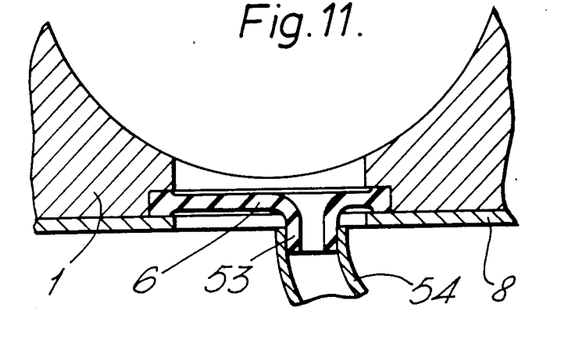
FIG. 11 shows a modification of the diaphragm of the sixth embodiment.

The use of an external passageway 11 also permits a modification of the diaphragm 6. Certain thermoplastic materials have resilient properties, so that they permit small deformations but resist larger deformations. FIG. 11 shows how this may be used. The diaphragm 6 is mounted on the sleeve 1 without any need for an upper plate 7 and the lower plate 8 simply holds the periphery of the diaphragm 6. An orifice 53 is moulded into the diaphragm and this connects to a tube 54 forming the external passageway.

In all the embodiments of FIGS. 6 to 10, the resilient wall 4 and the bellows wall 13 are joined adjacent tube 3. This is not necessary, and the two could be separate as shown in FIG. 4.

Figure 12:
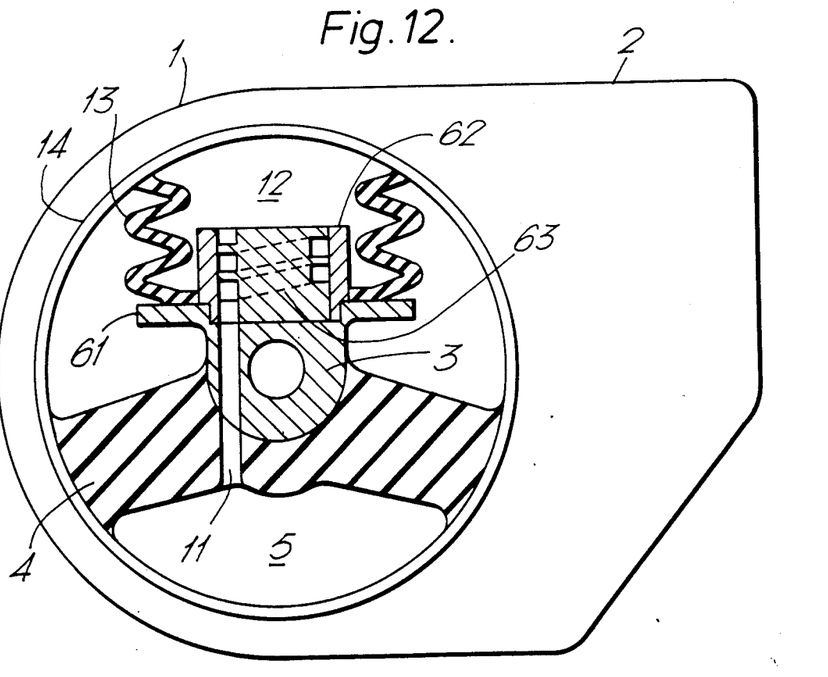
FIG. 12 shows a seventh embodiment of a hydraulically damped mounting device according to the present invention, having a convoluted passageway.

Referring next to FIG. 12 a hydraulically damped mounting device according to a seventh embodiment of the present invention is generally similar to the first, and the same reference numerals are used. However, unlike the first embodiment, the tube 3 has a flange 61 to which is attached the flexible wall 13 forming the bellows. Furthermore, the passageway 11 extends from the working chamber but not around the sleeve 1 as in the first embodiment. Initially, this passes through the resilient wall 4 and then through a bore in the tube 3. The passageway 11 could then emerge directly into the compensation chamber, but in this embodiment it is preferable that the passageway is longer than would be provided by a straight connection, in order to achieve suitable damping characteristics. Therefore, a ring 62 is secured, by adhesive or some other mechanical fixture, and the inner surface of this ring 62 supports a helical tube 63 which communicates with the passageway 11. By providing a sufficient number of turns of tube 63 within the ring 62, the desired damping characteristics may be achieved.

Again many variations on this embodiment are possible. For example, the resilient wall 4 on the bellows wall 13 are shown as two separate formations, but they could be formed integrally to extend around the flange 61. A flexible diaphragm may also be formed in one wall of the working chamber 5, as such a diaphragm permits absorption of low amplitude, high frequency vibrations. These cannot be damped by movement of fluid through the passageway 11 as such movement is too slow to permit damping of such vibrations.

Figure 13:
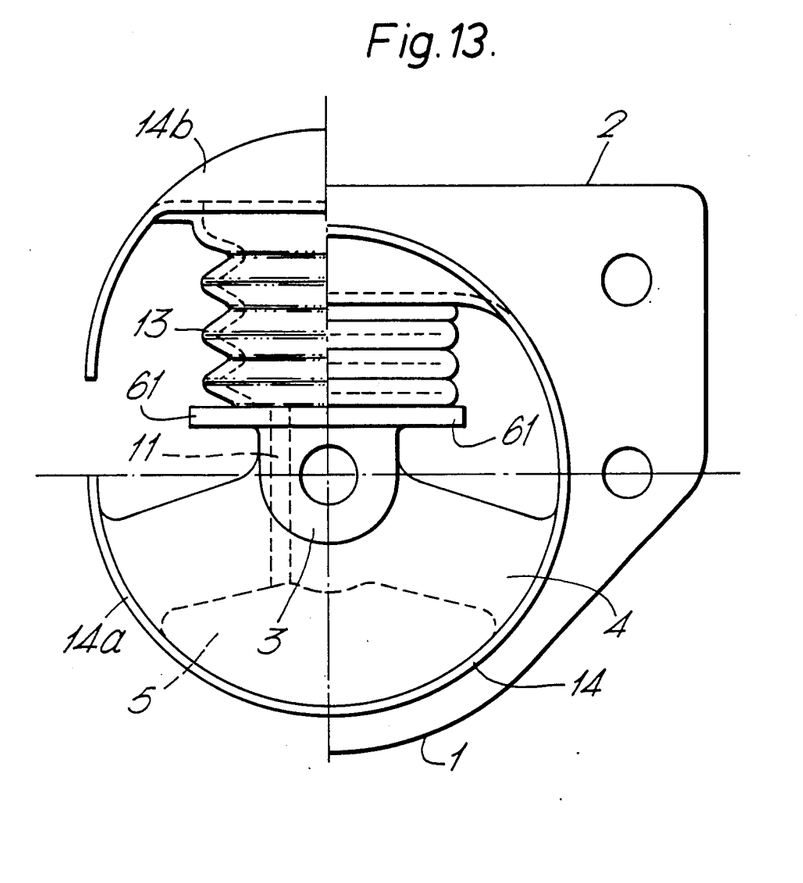
FIG. 13 shows an eighth embodiment of a hydraulically damped mounting device according to the present invention.
Figure 14:
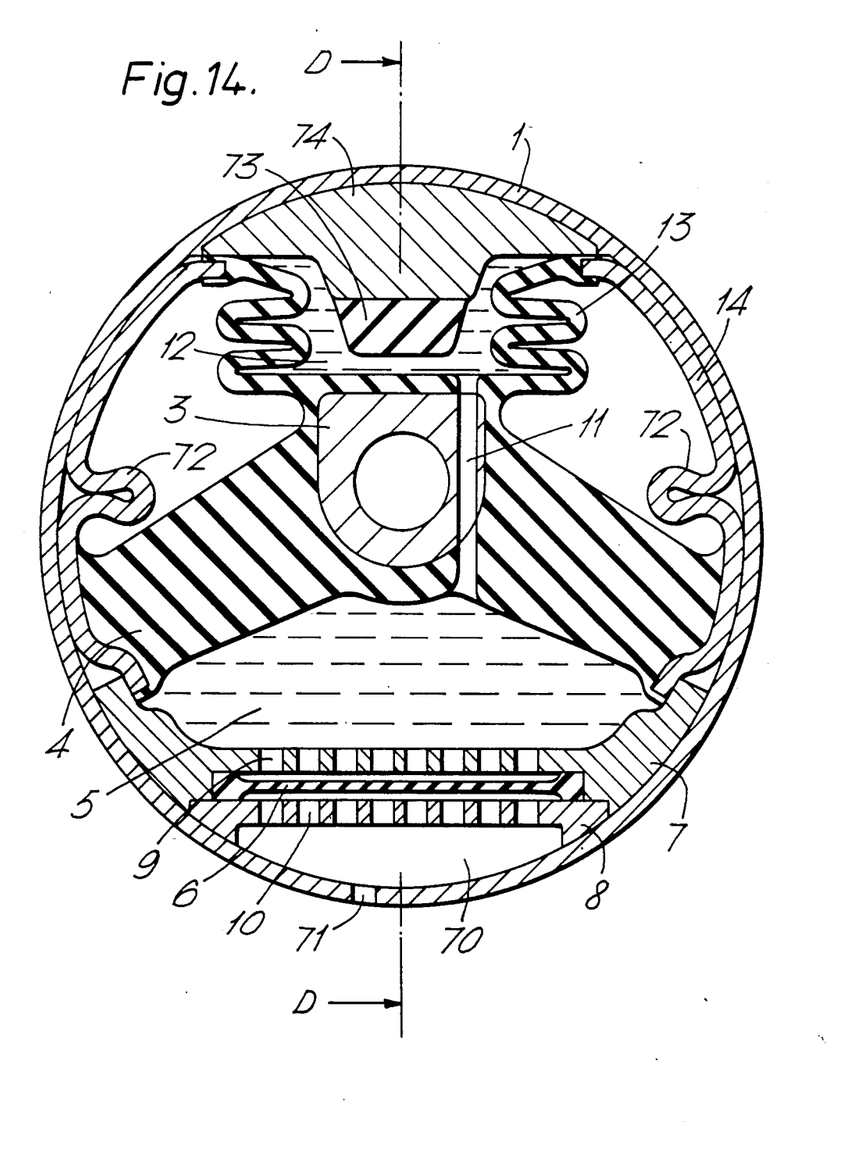
FIGS. 14 and 15 are two cross-sectional views of a ninth embodiment of a hydraulically damped mounting device according to the present invention, FIG. 15 being taken along the line D—D in FIG. 14.

Referring now to FIG. 14, the general structure of the hydraulically damped mounting device, once assembled, is similar to that of FIG. 1, and corresponding reference numerals are used. The assembled state is shown on the right hand side of FIG. 13.

However, in this embodiment the method of construction is somewhat different, in that the bellows wall is precompressed during the assembly of the mounting device. As can be seen from the left hand side of FIG. 13, the inner sleeve 14 is formed in two semi-circular halves 14a and 14b respectively. The resilient wall 4 is secured to the inside of one of these two halves 14a, so that the working chamber 5 is formed between the resilient wall 4 and that semi-circular half 14a. One end of the bellows wall 13 is connected to the flange 61 on the central tube 3, and the other end is secured to the second semi-circular half 14b, so that the compensation chamber is formed between that bellows wall and the second semi-circular half 14b. The passageway 11 joining the working chamber 5 and the compensation chamber may be a short passageway extending directly through the tube 3, or may be convoluted, e.g. by the use of helical tube 63 as shown in FIG. 12.

The two halves 14a and 14b of the inner tube are then pressed together, and this compresses the bellows wall 13. This permits a more compact construction, and also, acts as a stop against upward movement of the tube 3, as the bellows wall is compressed between the upper part of the inner sleeve 14 and the flange 61 on the tube 3. This limits tensile stress in the resilient wall 4. The presence of the flange 61 is also important in this respect, in that the convolutions of the bellows wall 13 press against the flange 61 when the bellows wall 13 is compressed, so acting as a limiting stop.

This arrangement has the advantage of ease of moulding, and also allows a very compact construction as there is less air space outside the bellows wall. This method of forcing together two halves of the sleeve is an independent aspect of the present invention applicable to many different types of mounting devices.

Figure 15:
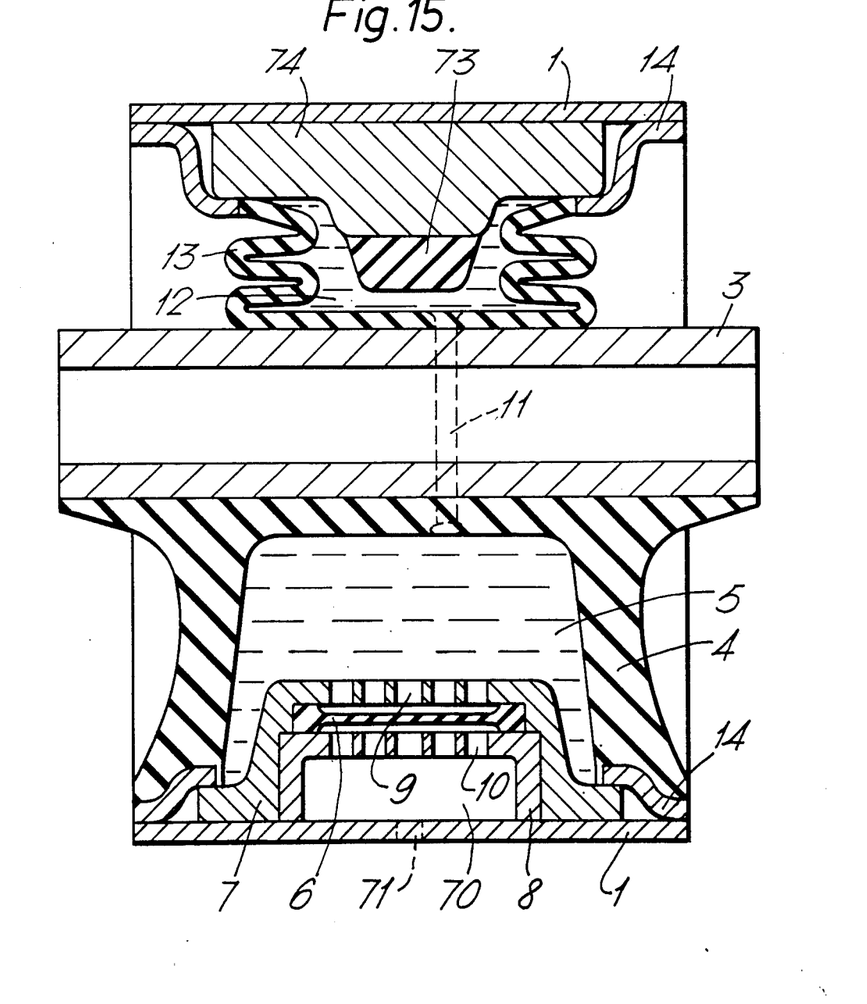

The compact construction achievable by the embodiment of FIG. 13 can also be achieved by the ninth embodiment shown in FIGS. 14 and 15. Again, the manufacture of the device involves the pressing together of two sleeve halves. However, unlike the embodiment of FIG. 13, the two sleeve halves are not completely separate, but instead are joined by a deformable part. Thus, referring to FIGS. 14 and 15, the mounting device has an outer sleeve 1 containing an inner sleeve 14 which supports a resilient wall 4 and a bellows wall 13. The tube 3, forming one anchor point, is moulded within the resilient wall 4, and the passageway 11 extends through the tube 3 as in the embodiments of FIGS. 12 and 13. As in the embodiment of FIG. 1, the working chamber 5 is bounded both by the resilient wall 4 and a diaphragm 6. As can be seen, a chamber 70 is formed between the diaphragm 6 and the outer sleeve 1, and an orifice 71 connects this chamber 70 with the exterior of the mounting device. The dimensions of the orifice 71 can be adjusted to vary the characteristics of the mounting device. If the orifice 71 is large, then the diaphragm 6 acts as if its side away from the working chamber 5 was open to the atmosphere. On the other hand, however, if the orifice 71 is small, the chamber 70 may act as an air pocket, creating a gas-spring effect. Vibrations of the tube 3 of small amplitude and high frequency may then be absorbed by movement of the diaphragm 6, without any significant fluid movement to or from the working chamber 5. This gas-spring effect is discussed in more detail in EP-A-0115417 mentioned above.

As mentioned above, the inner sleeve 14 is formed in two halves connected by a deformable part (shown deformed at 72 in FIG. 14). Initially, this part 72 is not deformed, which means that there is a greater space for receiving the bellows wall 13, and this makes fitting of the bellows wall 13 easier. Then the deformable part 72 is compressed to the position shown, and this forces the top end of the bellows wall 13 towards the tube 3.

As shown in FIGS. 14 and 15, the working chamber 12 contains a stop 73 mounted on a part 74 fitting between the outer and inner sleeves 1 and 14. This stop 73 limits upward movement of the tube 3, and this can be arranged so that it is not possible for the tube 3 to move upwards sufficiently for the resilient wall 4 to be put under tension.

Also, unlike the embodiment of FIG. 1, the plates 7 and 8 holding the diaphragm 6 are held in position by the outer and inner sleeves 1 and 14, and this ensures a firm construction.

The ninth embodiment shown in FIGS. 14 and 15 is easy to manufacture, and provides a mounting device with very satisfactory characteristics. Therefore, it is the presently preferred embodiment.

The present invention is particularly suitable for mounting between an engine and a vehicle. The high frequency vibrations of the engine, corresponding to its normal running, would then be relatively undamped, and the engine could, in effect, vibrate freely of the vehicle due to the absorption of the vibration by the diaphragm 6. Due to the construction of the mounting device, the behaviour at lower frequencies is entirely different, and indeed by design of the bending of the thinner part of the resilient deformable wall 4, and the shape of the passageway the mid-frequency response can be selected in dependence on the desired characteristics of the mounting device.

What is claimed is:

1. A hydraulically damped mounting device having first anchor and a second axial anchor, for damping vibrations in direction orthogonal to said second anchor comprising:
   a hollow sleeve formed at said first anchor;
   second anchor formed within said sleeve, said second anchor extending axially of said sleeve, said sleeve and said second anchor defining a space extending radially from said second anchor to said sleeve;
   a resilient wall within said space connecting said sleeve and said second anchor and thereby subdividing said space into two pockets, said resilient wall being adapted to be compressed in a predetermined direction when a load is applied to the hydraulically damped mounting device;
   a working chamber in one pocket of said space and enclosed between said sleeve and said resilient wall, said working chamber containing a liquid;
   a bellows wall of corrugated material withing said space in the other of said pockets;
   a compensation chamber within said space bounded, at least in part, by said bellows wall; and
   an open passageway connecting said working chamber and said compensation chamber to allow fluid communication of said liquid between said working chamber and said compensation chamber;
   said working chamber is physically separate from said bellows wall and having substantial different spring characteristics, thereby effectively separating the spring effect of the device from the damping effect thereof with the spring effect substantially determined by the resilient wall and the damping effect substantially determined by the flow characteristics of the passageway, and at least parts of said bellows wall remote from said second anchor point are physically separate from said resilient wall.

2. A hydraulically damped mounting device according to claim 1, wherein said passageway extends through said first anchor.

3. A hydraulically damped mounting device according to claim 1, wherein said passageway extends peripherally of said hollow sleeve.

4. A hydraulically damped mounting device according to claim 1, wherein said sleeve has an inner part and an outer part, said inner part of said sleeve containing said working chamber and said compensation chamber, said outer part of said sleeve having a bore therein receiving said inner part of said sleeve.

5. A hydraulically damped mounting device according to claim 4, wherein said passageway extends between said inner part and said outer part of said sleeve.

6. A hydraulically damped mounting device according to claim 1, having a resilient block in said compensation chamber, said resilient block being adapted to limit movement of said second anchor in a direction opposite to said predetermined direction.

7. A hydraulically damped mounting device according to claim 1, wherein said bellows wall is adapted to limit movement of said second anchor point in a direction opposite to said predetermined direction.

8. A hydraulically damped mounting device according to claim 1, having a flexible diaphragm in said sleeve such that said liquid in said working chamber contacts one side of said flexible diaphragm.

9. A hydraulically damped mounting device according to claim 1, wherein said resilient wall and said bellows wall are connected together adjacent said anchor.

* * * * *

UNITED STATES PATENT AND TRADEMARK OFFICE
CERTIFICATE OF CORRECTION

PATENT NO. : 4,690,389

DATED : September 1, 1987

INVENTOR(S) : John P. West

It is certified that error appears in the above-identified patent and that said Letters Patent is hereby corrected as shown below:

On the front page, in the inventor's address, delete "Devizes" and insert therefor --Wiltshire--.

In the Abstract, line 14, delete "manurfacture" and insert therefor --manufacture--.

In Column 4, line 32, delete "damper" and insert therefor --damped--.

In Column 10, line 41, delete "withing" and insert therefor --within--.

In Column 12, line 3, delete "point".

In Column 12, line 4, delete "predetermlned" and insert therefor --predetermined--.

In Column 12, line 11, after "said" insert --second--.

Signed and Sealed this

Nineteenth Day of April, 1988

Attest:

DONALD J. QUIGG

*Attesting Officer*           *Commissioner of Patents and Trademarks*